United States Patent
McCulloch et al.

(10) Patent No.: US 8,104,235 B2
(45) Date of Patent: Jan. 31, 2012

(54) APPARATUS AND METHOD FOR DETERRING BIRDS

(76) Inventors: Paul McCulloch, Roseville, MN (US); Richard M Irish, Crosslake, MN (US)

(*) Notice: Subject to any disclaimer, the term of this patent is extended or adjusted under 35 U.S.C. 154(b) by 432 days.

(21) Appl. No.: 12/188,980

(22) Filed: Aug. 8, 2008

(65) Prior Publication Data
US 2009/0049764 A1   Feb. 26, 2009

Related U.S. Application Data

(60) Provisional application No. 60/954,926, filed on Aug. 9, 2007.

(51) Int. Cl.
*E04B 1/72* (2006.01)
*A01K 61/02* (2006.01)
*A01K 37/00* (2006.01)

(52) U.S. Cl. .......... 52/101; 119/57.9; 119/713

(58) Field of Classification Search ........ 52/101; 119/57.9, 713; 114/361, 364
See application file for complete search history.

(56) References Cited

U.S. PATENT DOCUMENTS

| | | | | |
|---|---|---|---|---|
| 5,713,160 A * | 2/1998 | Heron | | 52/101 |
| 5,845,607 A * | 12/1998 | Kastner et al. | | 119/713 |
| 6,003,471 A * | 12/1999 | Ohba | | 119/713 |
| 6,082,285 A * | 7/2000 | Hinrichs | | 114/343 |
| 6,477,977 B1 * | 11/2002 | Combes | | 114/343 |
| 6,941,886 B1 * | 9/2005 | Suelzer | | 114/343 |
| 2002/0011036 A1 * | 1/2002 | Sabine | | 52/101 |
| 2003/0182876 A1 * | 10/2003 | Landers | | 52/101 |
| 2004/0006935 A1 * | 1/2004 | Moorhead | | 52/155 |
| 2005/0217187 A1 * | 10/2005 | Pace | | 52/101 |
| 2007/0295379 A1 * | 12/2007 | Basta | | 135/122 |

* cited by examiner

*Primary Examiner* — Eileen D Lillis
*Assistant Examiner* — Ryan Kwiecinski
(74) *Attorney, Agent, or Firm* — Schwegman, Lundberg & Woessner, P.A.

(57) ABSTRACT

A bird deterrent system includes a first riser attached to a structure, and a second riser attached to a structure. The bird deterrent system also includes a line attached between the first riser and the second riser. A riser includes a free end, and an attachment end. The attachment end includes an attachment mechanism for universal attachment to a frame member of a structure.

20 Claims, 7 Drawing Sheets

_US 8,104,235 B2_

APPARATUS AND METHOD FOR DETERRING BIRDS

CLAIM OF BENEFIT OF PRIOR-FILED APPLICATION

This patent application claims the benefit of U.S. Provisional Application Ser. No. 60/954,926, entitled "Apparatus and Method for Deterring Birds," filed on Aug. 9, 2007, the entire specification of which is incorporated herein in its entirety.

TECHNICAL FIELD

Various embodiments described herein relate to apparatus, systems, and methods associated with deterring birds. More specifically, the apparatus, systems and methods relate to a bird deterrent apparatus for structures near water.

BACKGROUND

Various birds can cause unaesthetic conditions. For example, birds many times produce droppings when leaving a perch. The resultant droppings not only can cause a stench but can also present a health hazard. For example, gull droppings have fecal bacteria that is nearly 100% _E. coli_. _E. coli_ is a type of bacteria associated with gastrointestinal illnesses if ingested by people.

If _E. coli_ levels become too high in the water, government officials may issue advisories against swimming. Beaches on Lake Michigan near Milwaukee have been closed due to high fecal coliform levels in the water. Several studies have identified gulls as a likely culprit of high fecal coliform levels that have led to closing South Shore Beach for about half of the swimming season one year.

In addition to the health hazard, the stench produced on structures near the water can be overpowering. In addition, the bird droppings are not pleasing to view. For example, many people have beach and lake homes. Some of these homes have boat lifts or other structures near the water that gulls and other birds like to perch on. A homeowner is not pleased when bird droppings can be seen on these structures. Structures covered with bird droppings do not make for a "good view" of the lake or ocean. If the structure is something that humans use even occasionally, it is also unpleasant to go near the structure due to an overpowering stench.

The homeowner or caretakers also have to spend inordinate amounts of time cleaning up after the birds. This is not only unpleasant but a huge waste of time since the stains from bird droppings are hard to remove.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

The description set out herein illustrates the various embodiments of the invention and such description is not intended to be construed as limiting in any manner.

DETAILED DESCRIPTION

Figure 1:
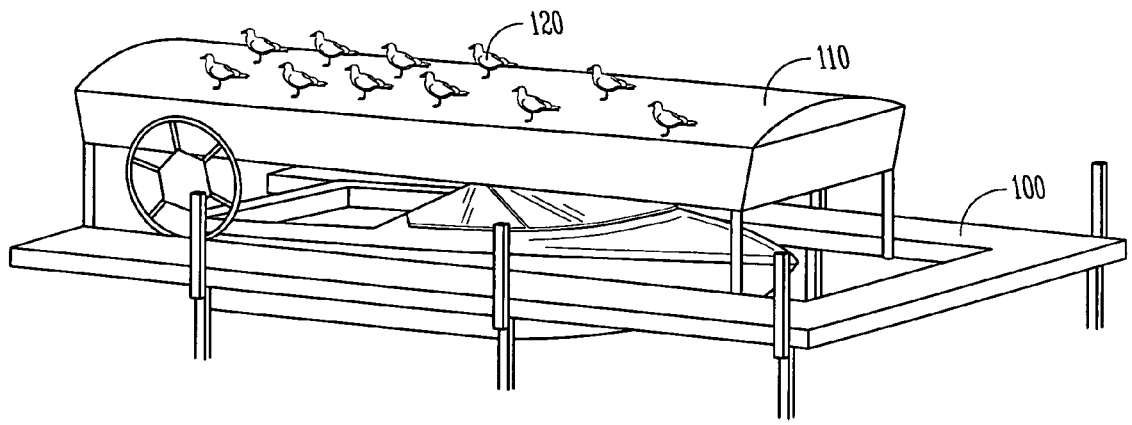
FIG. 1 is a perspective view of a covered boat lift that includes a canopy covered with perching gulls.

FIG. 1 is a perspective view of a covered boat lift 100 that includes a canopy 110 without a bird deterrent system. Without any sort of bird deterrent system, there are a number of birds, such as seagulls perched upon the canopy 110. A representative seagull carries the reference numeral 120. As mentioned in the background of the invention the birds or gulls will leave droppings on the canopy 110. The droppings cause stains which are difficult to remove from the canopy 110. In addition the stains are unpleasant to view and may cause a stench which is unpleasant for homeowners and people along a beach to be around. Still a further problem is that the bird droppings may present a health problem.

Figure 2:
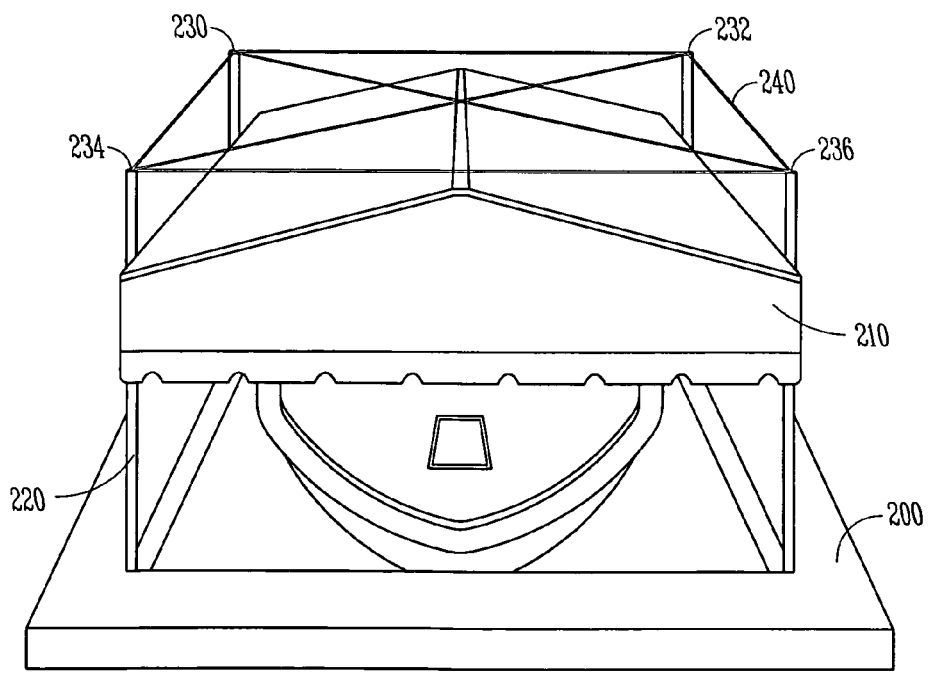
FIG. 2 is a front view of a boat lift that includes a bird deterrent structure, according to an example embodiment described herein.

FIG. 2 is a front view of a boat lift 200 that includes a canopy 210. The canopy 210 is held above the boat by a frame structure 220. A portion of the frame structure 220 can be seen in FIG. 2. Attached to the frame are at least a first riser 230, a second riser 232, a third riser 234 and a fourth riser 236. Each riser 230, 232, 234, 236 is attached to the frame. The riser includes a frame attachment portion as well as a portion which extends above the canopy 210. The canopy 210 is typically canted or inclined like the roof of a house or other structure so as to more easily shed the elements, such as rain. The risers 230, 232, 234, 236 have an elongated portion that extends to the height which is above the maximum height of the canopy 210. When birds perch on the canopy 210 they tend to perch at a site which is at least high enough to see over the highest portion of the structure since the birds are constantly on the lookout for predators. The bird deterrent structure extends above the highest point of the canopy.

Each of the risers 230, 232, 234, 236 includes an opening therein near a free end of the riser 230, 232, 234, 236. The bird deterrent system also includes a fishing line 240 which is strung between the risers 230, 232, 234, 236. Each of the risers 230, 232, 234, 236 has an opening therein for receiving a small nylon line, such as a fishing line 240. Fishing line 240 is used since it is nearly invisible or has low visibility for human beings. One such fishing line that can be used is monofilament type fishing line that has a high strength rating. Such monofilament fishing line is relatively inexpensive and strong and yet is nearly invisible to the human. A bird, such as a gull, does not like fishing line and therefore will avoid it.

The gull or other bird is able to see the fishing line 240. Since the fishing line is near the top of the canopy 210 the gull will avoid the canopy for fear that it will become entangled in the nylon or monofilament fishing line.

Optionally, the line is strung between risers so that it is taught. In some examples, the line is strung so that it is allowed to droop. In some of the examples where the line is strung and allowed to droop, the line remained above the structure to which it is mounted, such as a canopy. The light weight of a fishing line assists in ensuring that the line remains taught, but other materials that facilitate this are also possible.

Figure 3:
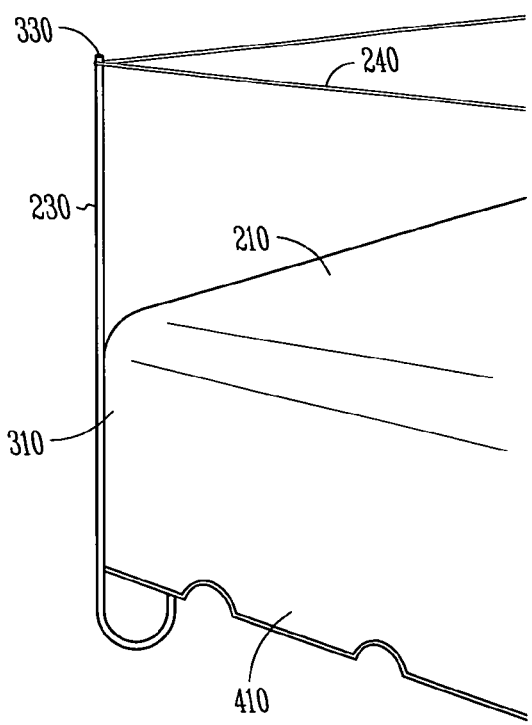
FIG. 3 is a view of a corner of a boat lift that includes a riser of the bird deterrent structure, according to an example embodiment described herein.
Figure 4:
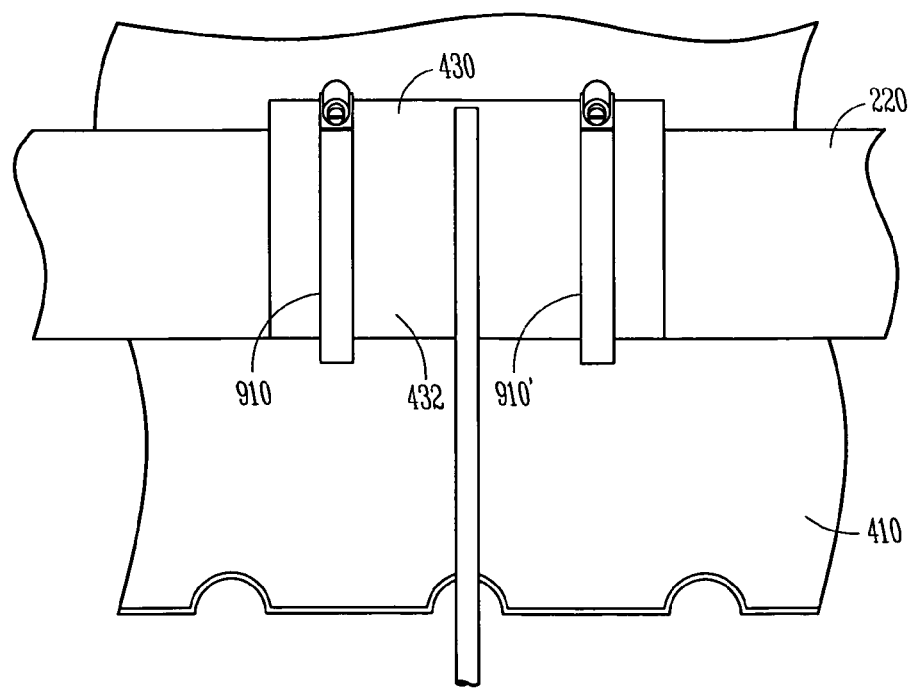
FIG. 4 is a view of a corner of the boat lift from beneath a canopy, according to an example embodiment.

FIG. 3 is a view of a corner 310 of the canopy 210 from a boat lift that includes a riser 230, according to the embodiment of the invention. FIG. 4 is a view of a corner 310 of the canopy 210 from inside the boat lift, according to an example embodiment. Now referring to both FIGS. 3 and 4 the riser will be further detailed. The riser 230 has a free end 330 and an attachment end 430. The riser 230 is substantially J-shaped with the top of the "J" being the free end 330 and the other end of the "J" being the attachment end 430 as shown in FIG. 4. The attachment 430 attaches to the frame 220 of the boat lift and more specifically to the frame associated with the canopy 210 by way of a first hose clamp 910 and a second hose clamp 910'. The hose clamps 910, 910' are made of non-corrosive material. For example, the hose clamps 910, 910' can be made from stainless steel. The riser is shaped so that it extends down below a skirt 410 of the canopy 210. The attachment end 430 includes an L-shaped bracket 432 which will fit a square frame 220 or a round frame 220 associated with the canopy 210. The L-shaped bracket 432 is welded to the riser 230 at the attachment end 430. The L-shaped bracket 432 and the riser 230 are also made of a non-corrosive material, such as aluminum.

Figure 5:
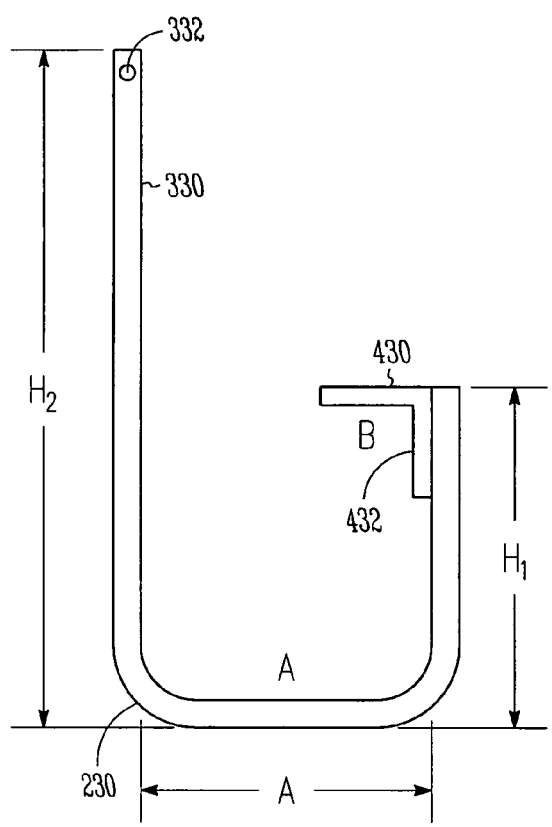
FIG. 5 is a side view of a riser, according to an example embodiment.
Figure 6:
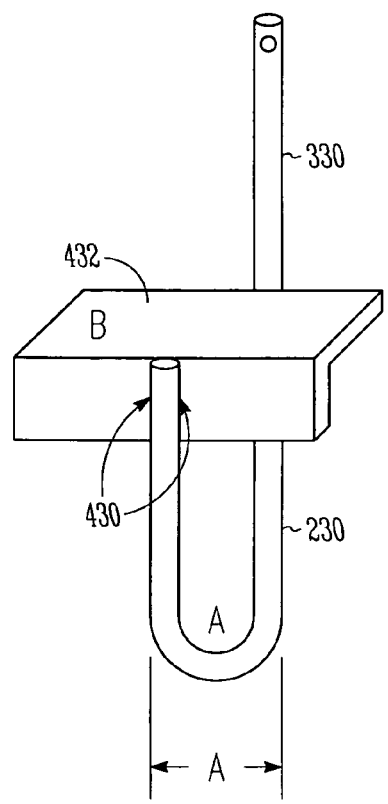
FIG. 6 is a perspective view of the riser shown in FIG. 5, according to an example embodiment.

FIG. 5 is a side view of a riser 230 and FIG. 6 is a perspective view of the riser shown in FIG. 5, according to an example embodiment. FIG. 5 shows that the riser has an attachment 430 that includes an L-shaped bracket 432. The L-shaped bracket has a link that is sufficient to allow a first and a second hose clamp (shown in FIG. 4) to attach the riser 230 to a frame. The L-shaped bracket 432 is welded or otherwise attached to the attachment end 430 of the riser 230. It can also be seen that the riser 230 is J-shaped. The riser has a drop down height $H_1$ which is sufficient to drop the riser below the skirt of a canopy and then the riser also has a height $H_2$ which places the free end 330 above the height of the canopy. In one embodiment of the invention the height $H_2$ is sufficient to place the free end 330 of the riser above the total height of the canopy while in another embodiment the height $H_2$ is merely sufficient to place the free end 330 of the riser 230 over the canopy. In the second embodiment a fishing line or monofilament line will be strung more closely to the canopy and more of the risers 230 will be needed. For example, on a small boat lift, at least six risers will be needed to cover the perimeter of the canopy. One at each of the corners and two at the peaks if the height $H_2$ is made so that it is just above the canopy. The free end 330 of the riser 230 also includes an opening 332. The opening 332 is for fishing line or monofilament line. In some embodiments of the invention the opening 332 may be provided with a grommet to prevent or to lessen line abrasion from the line moving within the opening due to wind or other conditions. Of course it would be best to use abrasion resistant monofilament line if at all possible. The J-shaped bracket also has a width A. The width A is sufficient to provide clearance for the skirt and to place the elongated leg of the J-shaped riser outside of the canopy 210 of the boat lift.

Figure 7:
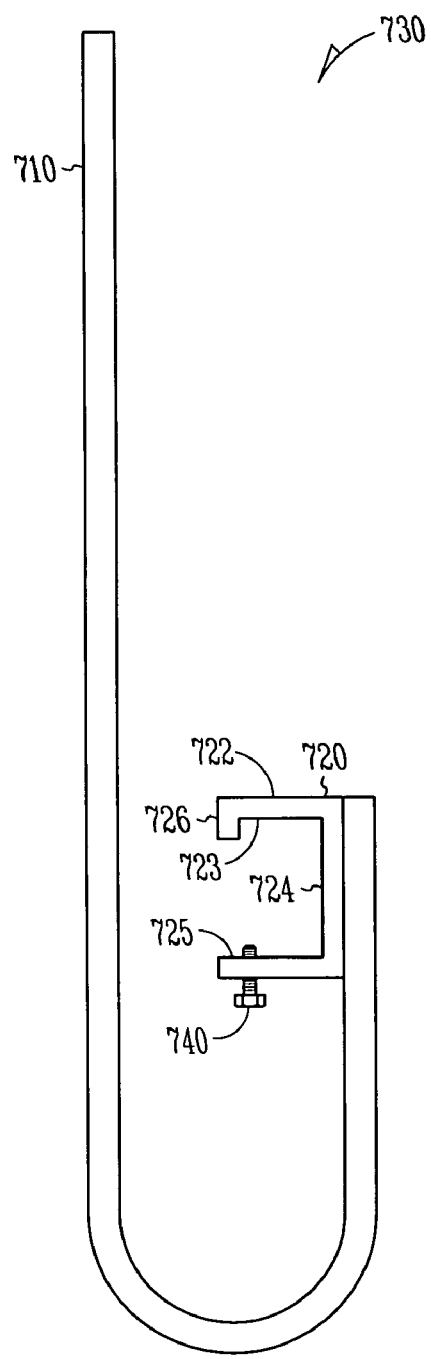
FIG. 7 is a side view of a riser, according to an example embodiment.

FIG. 7 is a side view of another embodiment of a riser 730. The riser 730 includes a free end 710 and an attachment end 720. This particular riser has an attachment end for a rectangular frame on a boat lift. The attachment end includes a bracket 722 which includes three sidewalls 723, 724, 725 and a lip 726. The sidewall 725 is in a bottom position and includes a set screw 740. The bracket 722 is fit over a square or rectangular frame member. The lip 722 and the sidewall 724 limit substantial horizontal movement of the bracket. The set screw 740 is then turned until the bottom end engages the frame; therefore the set screw and the sidewall 723 hold the riser 730 in place.

Figure 8:
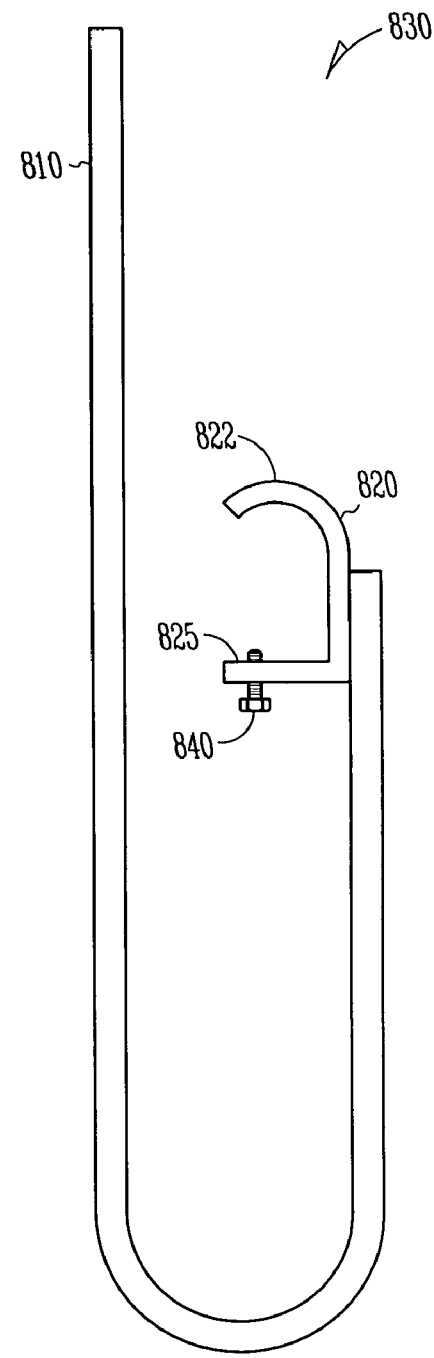
FIG. 8 is a side view of a riser, according to an example embodiment.

FIG. 8 is a side view of yet another embodiment of a riser 830. The riser 830 includes a free end 810 and an attachment end 820. The attachment end is essentially C-shaped. The attachment end also includes a bottom sidewall 825 that carries a set screw 840. The curved portion of the bracket 822 fits atop a circular or rounded frame member associated with a boat lift or other structure. The set screw 840 is turned until it engages the bottom surface of the frame member. The set screw and the bracket 822 hold the riser 830 in place.

Figure 9:
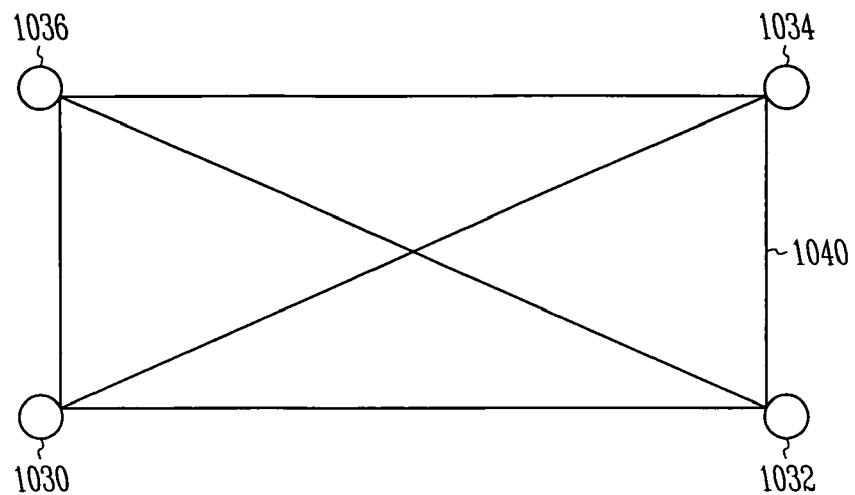
FIG. 9 is a chart showing instructions of a method for stringing fishing line between the risers, according to an example embodiment.

FIG. 9 is a chart showing instructions of a method for stringing fishing line 1040 between a set of risers, according to an example embodiment. Basically FIG. 9 can also be thought of as a schematic showing an arrangement for the fishing line 1040 between a set of risers 1030, 1032, 1034, and 1036. The risers 1030, 1032, 1034, and 1036 are attached to the frame of a structure, such as a boat lift. After the risers 1030, 1032, 1034, 1036 are attached to the boat lift appropriate fishing line 1040 is strung around the perimeter and then an X shaped pattern is made between riser 1030 and 1034 as well as between riser 1032 and 1036.

Figure 10:
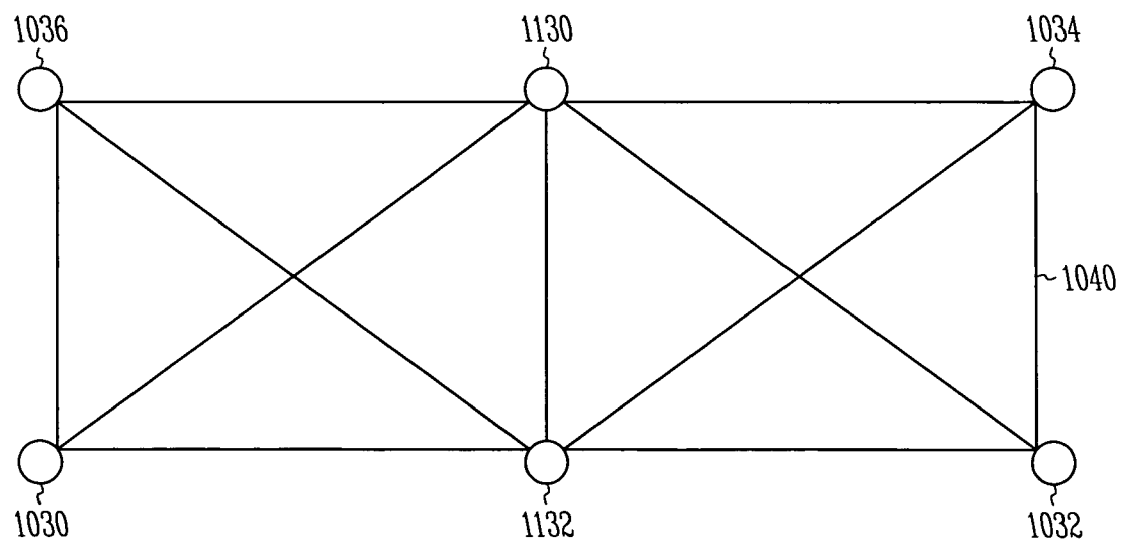
FIG. 10 is a chart showing instructions of a method for stringing fishing line between the risers, according to an example embodiment.

FIG. 10 is a chart showing instructions of a configuration for stringing fishing line between a set of risers and a longer structure, according to an example embodiment. FIG. 10 can also be thought of as a schematic diagram showing recommended configuration for stringing fishing line between a set of risers 1030, 1032, 1034, 1036, 1130 and 1132. On a longer structure it is suggested that two risers 1130, 1132 be added along the length of the structure. Once the risers 1030, 1132, 1032, 1034, 1130 and 1036 are attached to the perimeter of the structure fishing line 1040 is attached to the risers about the perimeter of the structure. Next the line is also passed from riser 1030 to riser 1130 and from riser 1130 to riser 1032 and from riser 1034 to 1132 and from 1132 to 1036. This forms two Xs over the length of the canopy. Birds don't generally like fishing line as they realize they may become entangled therein and so stay off the structure.

Figure 11:
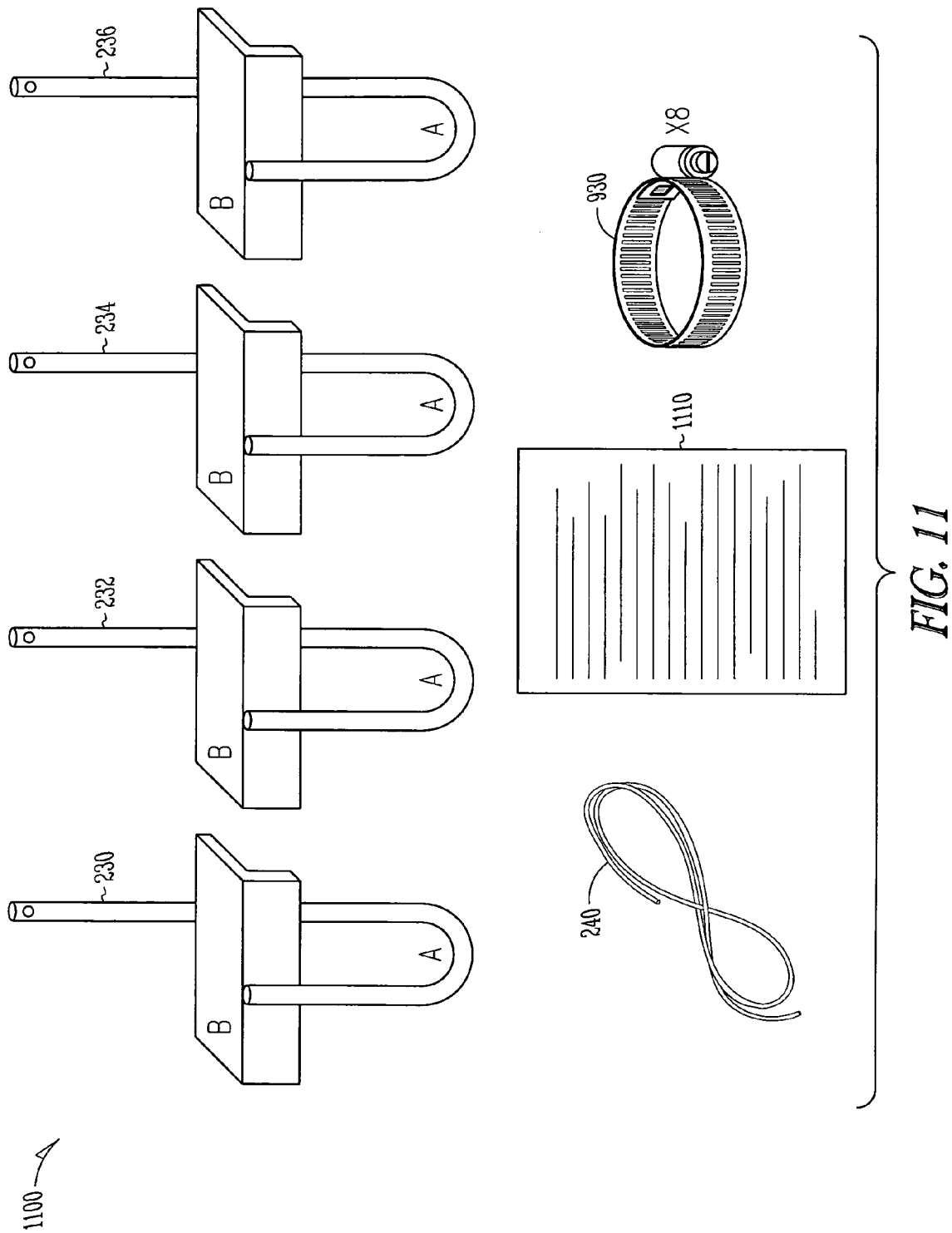
FIG. 11 is a schematic view of a kit supplemental cover, according to an example embodiment.

FIG. 11 is a schematic view of a kit 1100, according to an example embodiment. The kit includes everything one would need in order to implement a bird deterrent system. For example the kit includes a set of risers, such as risers 230, 232, 234, 236 a set of hose clamps 930, fishing line or an appropriate monofilament line 240 as well as instructions 1110. The instructions detail how to attach the risers to the frame of the canopy. The instructions can also include suggested configurations for various boat lifts as depicted and discussed with respect to FIGS. 9 and 10. There are generally two hose clamps 930 provided for each riser. In some kits there may be additional hose clamps provided in the event the user should lose a hose clamp or need a replacement hose clamp for the future. The hose clamps 930 are generally made of stainless steel so that they are corrosion resistant.

Figure 12:
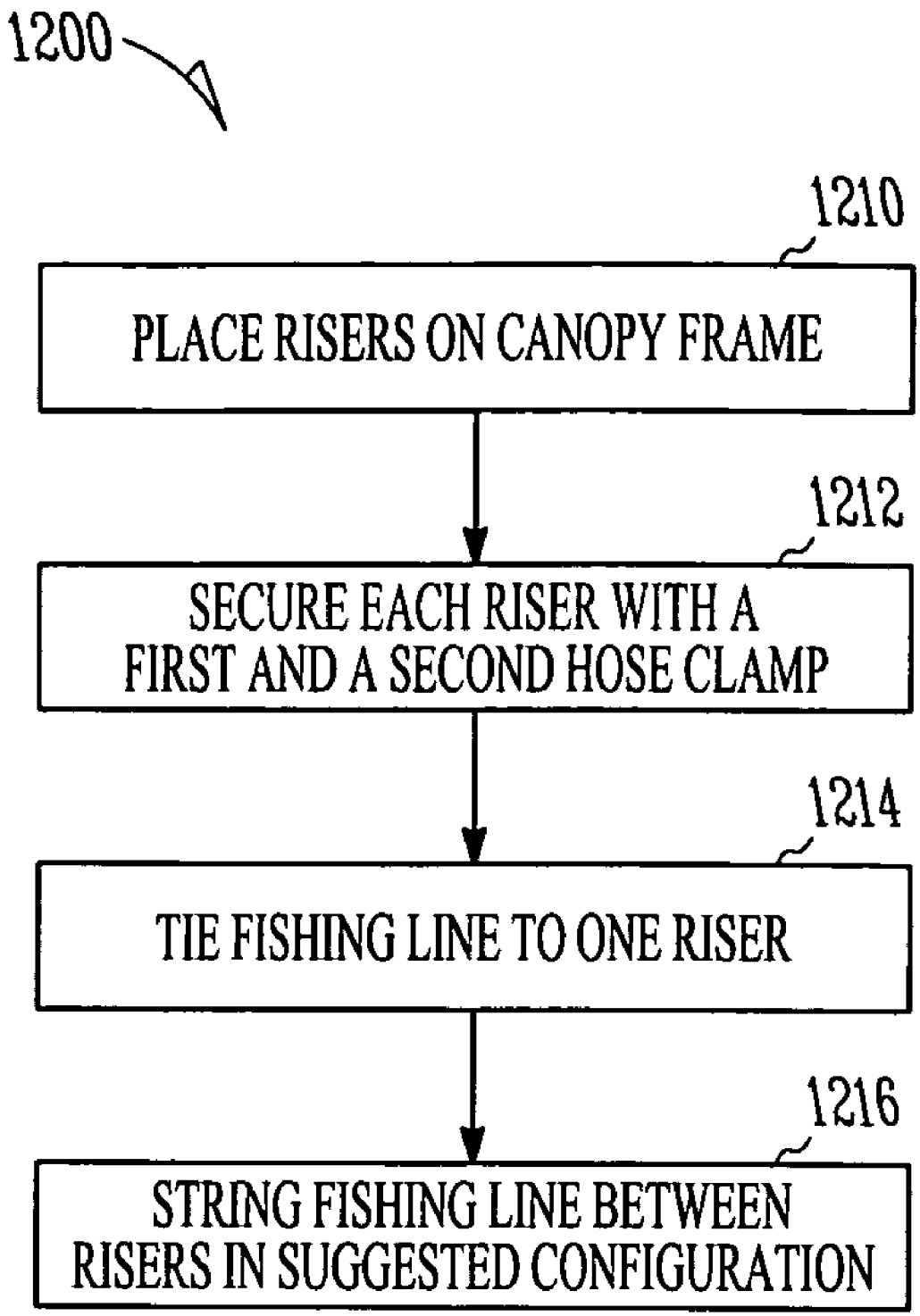
FIG. 12 is a flow chart of a method for assembling the riser system, according to an example embodiment.

FIG. 12 is a flow chart of a method 1200 for assembling a riser system, according to an example embodiment. The method 1200 includes placing the risers on the canopy frame 1210, securing each riser with a first a and second hose clamp 1212 then tying a fishing line or other monofilament line to deter the birds to one riser 1214. The fishing line is then strung between the risers in a suggested configuration as depicted by reference numeral 1216. Of course in other embodiments the riser may be attached using a set screw. It should be understood that the risers are made to have a more or less universal attachment end so that the risers can fit many if not all of the various boat lifts. It should also be understood that boat lifts are an example structure and that a similar set of risers could be provided for any type of structure including boat houses, gazebos and even a cabin or house or lighthouse or the like. Any structure that is near the water where it is desired to deter birds from landing or perching on the structure can be outfitted with a set of risers and fishing line can be strung between the risers to deter birds, thereby forming a bird deterrent system.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A system for providing overhead cover from climate elements while deterring birds from perching, comprising:
    a frame comprising a plurality of rectangular frame members;
    a canopy resting on the frame and coupled to the frame, the canopy to cover an area, the canopy having a skirt that hangs on sides of the canopy; and
    a plurality of risers coupled to the frame, each riser configured to extend along three sides of the skirt, outside the skirt, under the skirt, and inside the skirt, each riser comprising:
        means for coupling to the frame inside the canopy,
        means for extending away from the coupling inside the canopy and under the skirt of the canopy,
        means for extending above the canopy outside the area covered by the canopy, and
        means for coupling to a nylon line above the canopy;
        wherein the means for coupling to the frame include a top sidewall with a lip portion to extend along a first side of one of the plurality of rectangular frame members, and a bottom sidewall opposite the top sidewall, with a set screw disposed through the bottom sidewall, the set screw to pinch the frame between the top sidewall and the set screw; and
    a nylon line coupled between at least two of the plurality of risers , the nylon line coupled above the canopy and extending along a perimeter of the area covered by the canopy.

2. The system of claim 1, wherein the means for coupling to the frame include an L-shaped bracket to mate to a corner of a rectangular frame member of the plurality of rectangular frame members such that two sides of the L-shaped bracket abut the frame member.

3. The system of claim 2, wherein the means for coupling to the frame include at least one pipe clamp to clamp the two sides of the L-shaped bracket to the frame member.

4. The system of claim 1, wherein the frame is part of a boat lift to be disposed in a body of water, and each of the plurality of risers is formed of a material to resist corrosion caused by water of the body of water.

5. The system of claim 4, wherein each riser is formed of aluminum.

6. The system of claim 1, wherein the plurality of risers includes four risers attached to the frame at four corners, the four corners defining a rectangle, with the line extending between each of the risers.

7. The system of claim 1, wherein the nylon line comprises a monofilament fishing line.

8. A bird deterrent system for connection to a structure including a frame covered with a canopy including a skirt on at least one side of the canopy, comprising:
    a first riser to attach to the structure, the first riser including a first vertical line support configured to extended above the canopy, and a first attachment portion coupled to the first vertical line support, the first attachment portion configured to extend away from the first vertical line support, under the skirt and vertically up to the frame such that the first vertical line support and the first attachment portion are configured to extend along three sides of the skirt, outside of the skirt, under the skirt, and on the inside of the skirt, the first attachment portion including a first attachment mechanism configured to attach to the frame;
    a second riser to attach to the structure, the second riser including a second vertical line support configured to extended above the canopy, and a second attachment portion coupled to the second vertical line support, the second attachment portion configured to extend away from the second vertical line support, under the skirt and vertically up to the frame such that the second vertical line support and the second attachment portion are configured to extend along three sides of the skirt, outside of the skirt, under the skirt, and on the inside of the skirt, the second attachment portion including a second attachment mechanism configured to attach to the frame; and
    a line to attach to the first vertical line support of the first riser and the second vertical line support of the second riser to extend along a perimeter of the canopy.

9. The system of claim 8, wherein the attachment mechanism includes a bracket to couple the first riser to the frame with two pipe clamps disposed on opposite sides of the attachment portion and on opposite sides of the first riser.

10. The system of claim 8, wherein the attachment portion includes a bracket that has a length and an L-shape when cross sectioned perpendicular to the length, with the bracket being coupled to the first riser at approximately a middle of the length, and along a bottom of the L-shape.

11. The system of claim 8, wherein the attachment portion includes a curved portion to extend along a top of the frame.

12. The system of claim 11, wherein the attachment portion includes a bottom sidewall opposite the curved portion, the bottom sidewall to extend along a bottom of the frame.

13. The system of claim 12, comprising a set screw disposed through the bottom sidewall, the set screw to pinch the frame between the curved portion and the set screw.

14. The system of claim 8, wherein the first riser defines a J-shape, with a free end being a top of the J-shape.

15. The system of claim 8, wherein the line comprises a monofilament fishing line.

16. A method of deterring birds from perching on a canopy including a skirt that is mounted to a frame with the skirt hanging over at least one side of the frame, the method comprising:

attaching at least two risers to the frame by attaching an attachment portion of each of the at least two risers to the frame, inside the skirt and under the canopy, with a line support portion of each of the at least two risers extending outside the skirt, over the canopy, with each riser extending from above the canopy to below the skirt, inside the skirt and vertically to the frame; and supporting one or more deterrent lines, with each of the line support portions of the at least two risers, above a structure to be protected from birds, wherein the deterrent lines are disposed in a pattern and have a diameter sized to deter birds from settling near the structure.

17. The method of claim 16, wherein the structure defines a rectangular top having a perimeter and wherein supporting one or more deterrent lines above the structure to be protected from birds comprises:

connecting risers at each of four corners of the top and approximately at each of centers of long sides of the rectangular top; and extending the one or more deterrent lines between the risers around the perimeter to define a rectangle pattern and between the risers across the top to define a pattern of two adjacent X-shapes with each X-shape crossing the top.

18. The method of claim 16, wherein the structure defines a rectangular top having a perimeter, and wherein supporting one or more deterrent lines above the structure to be protected includes extending the deterrent lines around the perimeter of the structure to define a rectangular pattern and extending the deterrent lines across the structure to define an X-shaped pattern.

19. The method of claim 18, further comprising:
connecting risers at four corners of the perimeter; and
extending the one or more deterrent line between each of the risers.

20. The method of claim 16, wherein supporting one or more deterrent lines includes supporting one or more monofilament fishing lines.

* * * * *